(12) United States Patent
Kato (10) Patent No.: US 11,400,758 B2
(45) Date of Patent: Aug. 2, 2022

(54) TIRE

(71) Applicant: SUMITOMO RUBBER INDUSTRIES, LTD., Hyogo (JP)

(72) Inventor: Tomoki Kato, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 460 days.

(21) Appl. No.: 16/357,899

(22) Filed: Mar. 19, 2019

(65) Prior Publication Data

US 2019/0291512 A1    Sep. 26, 2019

(30) Foreign Application Priority Data

Mar. 26, 2018   (JP) .............................. JP2018-058487

(51) Int. Cl.
| | |
|---|---|
| *B60C 9/22* | (2006.01) |
| *B60C 9/26* | (2006.01) |
| *B60C 9/10* | (2006.01) |
| *B60C 11/03* | (2006.01) |
| *B60C 9/20* | (2006.01) |

(52) U.S. Cl.
CPC .............. *B60C 9/10* (2013.01); *B60C 9/2003* (2013.01); *B60C 9/22* (2013.01); *B60C 9/2204* (2013.01); *B60C 9/263* (2013.01); *B60C 11/0332* (2013.01); *B60C 2009/2016* (2013.01); *B60C 2009/2035* (2013.01); *B60C 2009/2041* (2013.01); *B60C 2009/2219* (2013.01); *B60C 2009/2223* (2013.01); *B60C 2200/04* (2013.01); *B60C 2200/06* (2013.01); *B60C 2200/10* (2013.01)

(58) Field of Classification Search
CPC . B60C 9/18; B60C 9/1807; B60C 2009/2219; B60C 2009/2223; B60C 9/26; B60C 9/263; B60C 2009/266
See application file for complete search history.

(56) References Cited

U.S. PATENT DOCUMENTS

2018/0244110 A1* 8/2018 Ando ...................... B60C 9/22

FOREIGN PATENT DOCUMENTS

| EP | 416893 | * | 3/1991 |
| EP | 3069862 | * | 9/2016 |
| JP | 4382519 | * | 12/2009 |
| JP | 2015-174569 A | | 10/2015 |

* cited by examiner

*Primary Examiner* — Justin R Fischer (74) *Attorney, Agent, or Firm* — Greenblum & Bernstein, P.L.C.

(57) ABSTRACT

A tire with a tread reinforcing layer that includes a ply reinforcing structure formed by winding a cord-embedded rubber tape circumferentially of the tire. The ply reinforcing structure includes first oblique segments and second oblique segments which intersect with each other to form a mesh structure having rhombic spaces. The circumferential lengths of the rhombic spaces are less than ⅔ times the maximum circumferential length of the ground contacting patch of the tire in its normally loaded state.

11 Claims, 5 Drawing Sheets

TIRE

TECHNICAL FIELD

The present invention relates to a tire having a tread reinforcing layer.

BACKGROUND ART

Patent Document 1 below describes a pneumatic tire including a tread reinforcing band. This band comprises first main portions and second main portions of a narrow strip of rubber coated cords, wherein the first main portions are inclined with respect to the circumferential direction, and the second main portions are inclined in the opposite direction to the first main portions to intersect with the first main portions. Such intersections improve the cornering performance because they increase the rigidity of the band and can produce large cornering power.

Patent Document 1: Japanese Patent Application Publication No. 2015-174569

SUMMARY OF THE INVENTION

Problems to be Solved by the Invention

However, it was found that the pneumatic tire of Patent Document 1 has room for improvement in the cornering performance as a result of experiments conducted by the present inventor.

The inventor studied the pneumatic tire disclosed in Patent Document 1 and found that rhombic spaces formed by being surrounded by the first main portions and second main portions contribute an improvement of the cornering performance.

In view of the above circumstances, the present invention has been devised, and its primary objective is to provide a tire capable of improving the cornering performance.

According to the present invention, a tire comprises a toroidal carcass and a tread reinforcing layer disposed radially outside the carcass in a tread portion of the tire, wherein the tread reinforcing layer comprises a ply reinforcing structure in which a long tape of at least one reinforcing cord coated with topping rubber is wound, the ply reinforcing structure comprises
a plurality of first oblique segments in which the tape is inclined with respect to the tire circumferential direction to one side in the tire axial direction, and
a plurality of second oblique segments in which the tape is inclined with respect to the tire circumferential direction to the other side in the tire axial direction
so that the second oblique segments intersect the first oblique segments, and the first oblique segments are arranged so that the side edges thereof do not contact with each other, and the second oblique segments are arranged so that the side edges thereof do not contact with each other, whereby the intersecting first and second oblique segments form a mesh structure having rhombic spaces, wherein circumferential lengths of the rhombic spaces are less than 2/3 times a maximum circumferential length of a ground contacting patch of the tread surface of the tread portion when the tire in its normally loaded state is contacted with a flat horizontal surface at a camber angle of 0 degree.

In the tire according to the present invention, the circumferential lengths of the rhombic spaces are preferably not less than 2/5 times the maximum circumferential length of the ground contacting patch of the tread surface.

Preferably, axial lengths of the rhombic spaces are less than 2/3 times the maximum circumferential length of the ground contacting patch of the tread surface.

Preferably, the axial lengths of the rhombic spaces are not less than 2/5 times the maximum circumferential length of the ground contacting patch of the tread surface.

Preferably, the mesh structure is disposed in a middle region between the tire equator and a tread edge.

It is preferable that the ply reinforcing structure comprises, in a crown region including the tire equator, a center spiral structure in which the tape extends circumferentially of the tire and spirally one or more turns.

Preferably, the ply reinforcing structure comprises, in a shoulder region including the tread edge, a lateral spiral structure in which the tape extends circumferentially of the tire and spirally one or more turns.

BRIEF DESCRIPTION OF THE DRAWINGS

FIG. 4(*a*) is a diagram for explaining an example of the ground contacting patch of the tread surface.

FIG. 4(*b*) is a diagram for explaining another example of the ground contacting patch of the tread surface.

DESCRIPTION OF THE PREFERRED EMBODIMENTS

The present invention can be applied to various tires such as pneumatic tires for passenger cars, motorcycles, heavy duty vehicles and the like, as well as non-pneumatic tires.

Taking a pneumatic tire as an example, embodiments of the present invention will now be described in conjunction with accompanying drawings.

Figure 1:
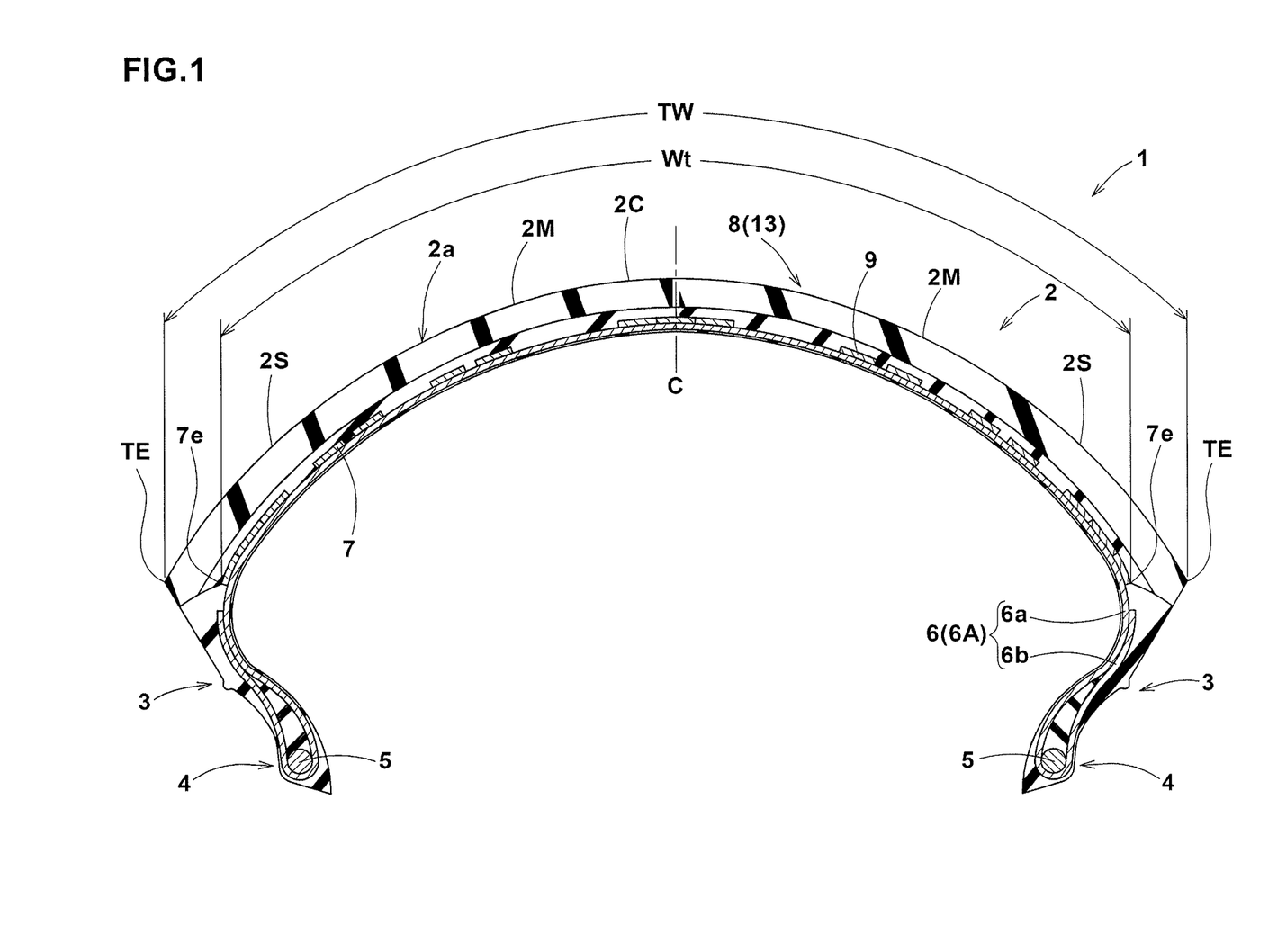
FIG. 1 is a cross-sectional view of a tire as an embodiment the present invention.

FIG. 1 shows a meridian cross-section including a tire rotational axis (not shown) of a motorcycle tire as an embodiment of the present invention in its normally inflated unloaded state.

In the case of a pneumatic tire, the normally inflated unloaded state is such that the tire is mounted on a standard wheel rim and inflate to a standard pressure but loaded with no tire load.

The normally loaded state is such that the tire is mounted on the standard wheel rim and inflated to the standard pressure and loaded with the standard tire load.

In this application including specification and claims, various dimensions, positions and the like of a pneumatic tire refer to those in the normally inflated unloaded state of the tire unless otherwise noted.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list.

For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load Capacity" in ETRTO, the maximum value given in the above-mentioned table in TRA or the like.

As shown in FIG. 1, the tire 1 of the present embodiment comprises: a tread portion 2 whose radially outer surface defines the tread surface 2a contacting with the ground, a pair of axially spaced bead portions 4 mounted on rim seats, a pair of sidewall portions 3 extending between the tread edges TE and the bead portions 4, a toroidal carcass 6 extending between the bead portions through the tread portion and the sidewall portions, and a tread reinforcing layer 7 disposed radially outside the carcass 6 in the tread portion 2.

As a characteristic of a motorcycle tire, the tread portion 2 (inclusive of the carcass 6, tread reinforcing layer 7 and a tread rubber thereon) is convexly curved so that the tread surface 2a between the tread edges Te is curved like an arc swelling radially outwardly, and the maximum cross sectional width of the tire 1 occurs between the tread edges TE.

The tread portion 2 compresses a crown region 2C centered on the tire equator C, a pair of shoulder regions 2S extending axially inwardly from the respective tread edges TE, and a pair of middle regions 2M between the respective shoulder regions 2S and the crown region 2C. The crown region 2C is a region contacting with the ground mainly during straight running. The middle region 2M is a region contacting with the ground when the motorcycle is leant to initiate a turn and during cornering. The shoulder region 2s is a region contacting with the ground when the motorcycle is leant largely during cornering.

The carcass 6 is composed of at least one carcass ply 6A. The carcass ply 6A is made of carcass cords rubberized with topping rubber and arranged radially at an angle in a range from 75 to 90 degrees with respect to the tire equator C, for example. The carcass ply 6A extends between the bead portions 4 through the tread portion 2 and the sidewall portions 3, and is turned up around a bead core 5 in each bead portion so as to form a pair of turned up portions 6b and a main portion 6a therebetween.

The tread reinforcing layer 7 is curved along the tread portion 2 and extends over the substantially entire width of the tread portion 2. As a result, the tread reinforcing layer 7 can increase the rigidity of the tread portion 2 over the entire width of the tread portion 2.

From such viewpoint, it is preferable that, in the tire meridian cross section, the developed width Wt of the tread reinforcing layer 7 measured therealong is set in a range from 75% to 95% of the developed tread width TW measured between the tread edges TE along the tread surface 2a.

The tread reinforcing layer 7 comprises a ply reinforcing structure 8 formed by winding a tape 9 around the carcass 6.

Figure 2:
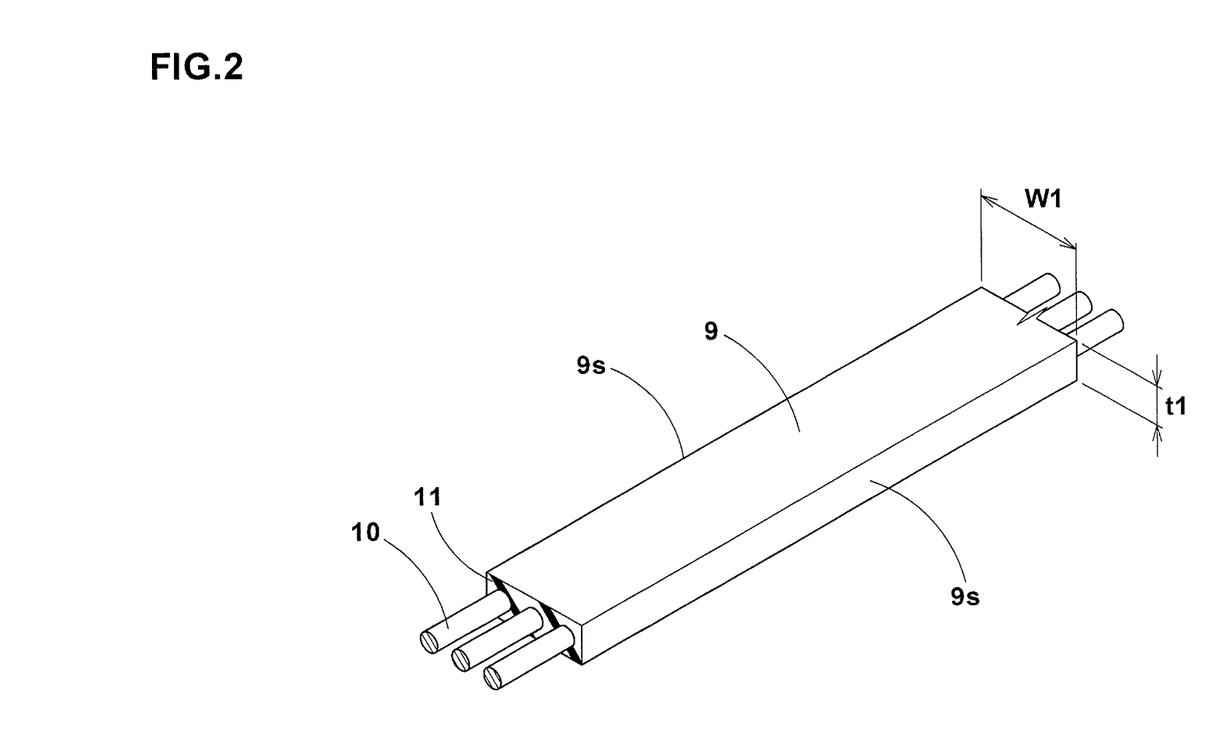
FIG. 2 is a perspective view of an example of the tape.

FIG. 2 shows an example of the tape 9. The tape 9 is one reinforcing cord or plural parallel reinforcing cords 10 coated with a topping rubber 11. In this example, the tape 9 includes a plurality of parallel reinforcing cords 10.

For example, a steel cord or an organic fiber cord is suitably used as the reinforcing cord 10.

The tape 9 has side edges 9s extending in the longitudinal direction of the tape, and the or each reinforcing cord 10 therein extends parallel with the side edges 9s. In this example, the cross sectional shape of the tape is substantially rectangle. The width W1 of the tape 9 is preferably set in a range from 2.5 to 12.0 mm, for example. The thickness t1 of the tape 9 is preferably set in a range from 0.6 to 3.0 mm, for example.

The ply reinforcing structure 8 includes a mesh structure 13 where the wound tape 9 intersects itself.

Figure 3:
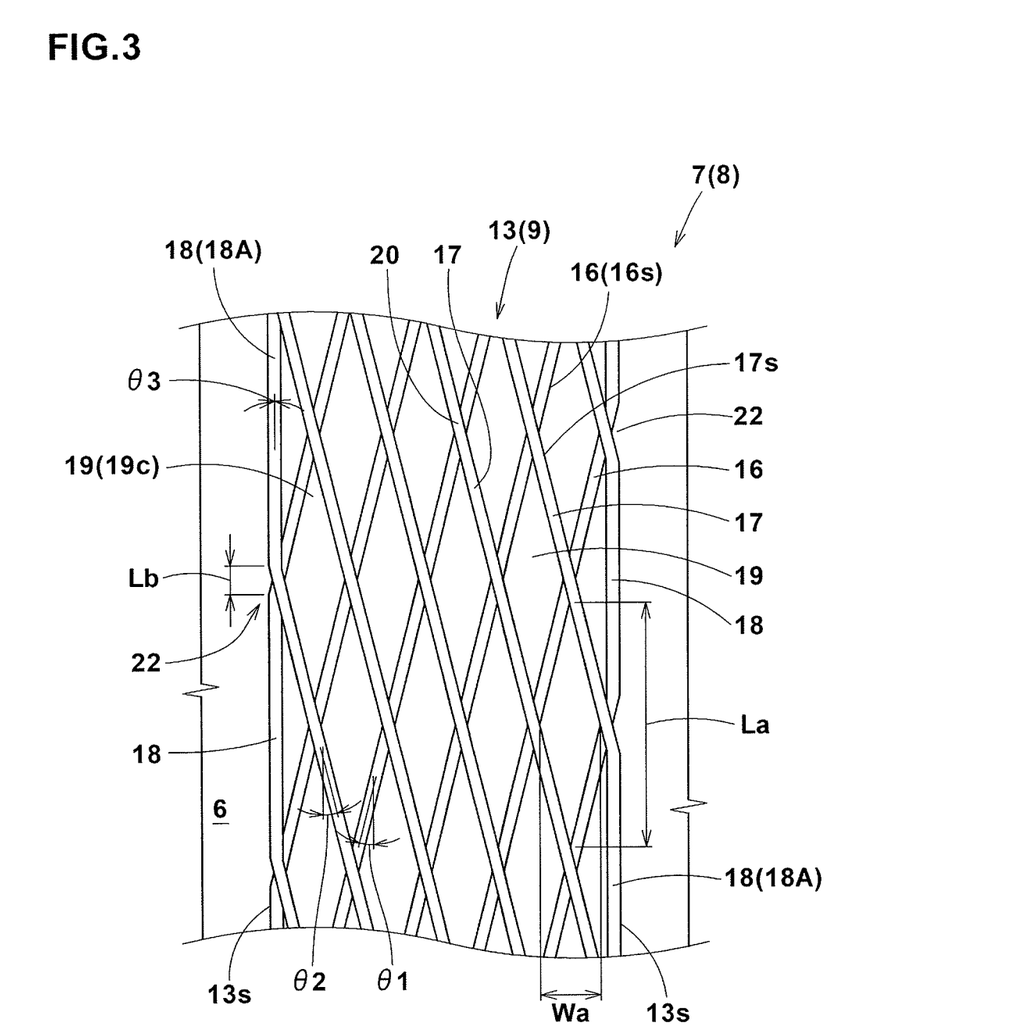
FIG. 3 is an developed partial view of an example of the mesh structure.

FIG. 3 is an developed view of a circumferential part of the mesh structure 13 developed in the tire circumferential direction and axial direction.

As shown, the mesh structure 13 comprises a plurality of first oblique segments 16 and a plurality of second oblique segments 17.

In the first oblique segments 16, the wound tape 9 is inclined with respect to the tire circumferential direction toward one side in the tire axial direction (diagonally right up in the figure).

In the second oblique segments 17, the wound tape 9 is inclined with respect to the tire circumferential direction in the opposite direction to the first oblique segments 16, namely, toward the other side in the tire axial direction (diagonally right down in the figure).

Thus, the first oblique segments 16 intersect the second oblique segments 17 to form the mesh structure 13.

In the mesh structure 13, the side edges 16s of the first oblique segments 16 are arranged without contacting with each other, and also side edges 17s of the second oblique segments 17 are arranged without contacting with each other, so rhombic spaces 19 surrounded by the intersecting first and second oblique segments 16 and 17 are formed.

When the tread portion 2 is subjected to a torsional force during running, the mesh structure 13 having such rhombic spaces 19 can effectively resist against torsional deformation of the tread portion 2 to enable a smooth or stable turning and cornering. Further, the intersecting portions 20 between the first oblique segments 16 and the second oblique segments 17 can increase the rigidity of the tread reinforcing layer 7, so the cornering performance can be improved.

In the present invention, the "rhomboid shape" includes not only those formed by four sides which are straight lines having the same length but also those formed by four sides which are not straight lines including a curved line such as an arc as far as the above-described function can be obtained.

The circumferential lengths La of the rhombic spaces 19 are set to be less than ⅔ times the maximum circumferential length LA of a ground contacting patch S (shown in FIG. 5) of the tread surface 2a of the tread portion 2 occurred when the tire 1 in its normally loaded state is contacted with a flat horizontal surface at a camber angle of 0 degree.

Figure 4A:
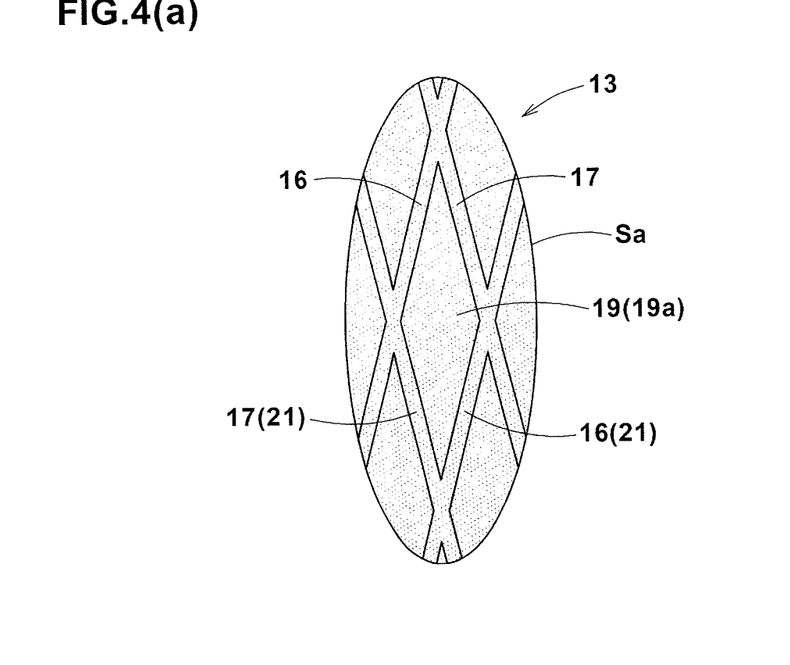

FIG. 4(a) schematically shows an example of the ground contacting patch Sa.

Figure 4B:
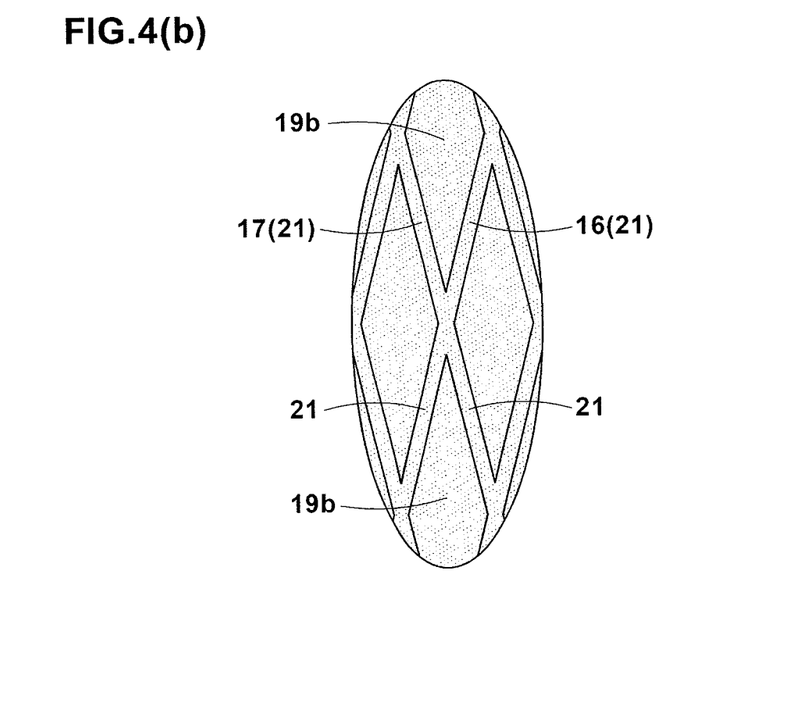

When the mesh structure 13 is positioned in the ground contacting patch Sa during running, by limiting the circumferential lengths La as described above, at least one rhombic space 19 is positioned in the ground contacting patch Sa. Here, the expansion "at least one rhombic space 19 is positioned in the ground contacting patch Sa" means not only that the entire shape of one rhombic space 19 is positioned in the ground contacting patch Sa as shown in FIG. 4(a) but also that a part of a rhombic space 19 and a part of another rhombic space 19—as shown in the center of FIG. 4(b) above and below, which form one rhombic space 19 or more part of the rhombic space 19 when combined into one—is positioned in the ground contacting patch Sa.

As a result, the mesh structure 16 can exert a large hoop effect in the ground contacting patch Sa, so a smooth turning or cornering becomes possible. Thus, according to the present invention, the cornering performance can be improved. Further, in the case of a motorcycle tire as in the present embodiment, the change in the contour shape of the ground contacting patch becomes particularly small between axially inside and outside of the tread portion 2.

Preferably, the circumferential lengths La of the rhombic spaces 19 are set to be not less than ⅖ times the maximum circumferential length LA of the ground contacting patch S. If the length La is less than ⅖ times the length LA, the total number of the first oblique segments 16 and second oblique segments 17 increases, and the mass of the tire 1 excessively increases. Thus, the cornering performance may be worsened.

Preferably, the axial lengths Wa of the rhombic spaces 19 are set to be less than ⅔ times the maximum axial length WA of the ground contacting patch S. As a result, one or more rhombic spaces 19 (in the above-explained sense) are positioned in the ground contacting patch Sa when the mesh structure 13 is positioned in the ground contacting patch Sa during running, and the cornering performance may be further improved.

However, from the viewpoint of suppressing an excessive increase in the mass of the tire, it is preferable that the axial lengths Wa of the rhombic spaces 19 are set to be not less than ⅖ times the maximum axial length WA of the ground contacting patch S.

It is preferable that the first oblique segments 16 have an inclination angle θ1 of not less than 1 degrees, more preferably not less than 3 degrees, still more preferably not less than 5 degrees with respect to the tire circumferential direction, and
the second oblique segments 17 have an inclination angle θ2 of not less than 1 degrees, more preferably not less than 3 degrees, still more preferably not less than 5 degrees with respect to the tire circumferential direction.
The angle θ1 and the angle θ2 are preferably not more than 20 degrees, more preferably not more than 15 degrees, and still more preferably not more than 10 degrees.
Incidentally, the angle of the tape 9 may be an average angle obtained by averaging over the circumference of the ply reinforcing structure 8.

It is preferable that the angle θ1 of the first oblique segments 16 is set to be equal to the angle θ2 of the second oblique segments 17 so that cornering power of the same magnitude may be generated when turning right and left to thereby allow a smoother turning.

The mesh structure 13 in this embodiment comprises a plurality of circumferential segments 18 extending substantially parallel with the tire circumferential direction.
The circumferential segments 18 suppress deformation of the carcass 6 to improve high-speed stability performance.

The circumferential segments 18 have an angle θ3 of not more than 5 degrees, preferably not more than 2 degrees with respect to the tire circumferential direction. In this example, the angle θ3 is set to a most preferable value of 0 degree.

The circumferential segments 18 are disposed at both ends 13s in the width direction of the mesh structure 13.

Both ends in the tire circumferential direction of each of the circumferential segments 18 are respectively connected to one of the first oblique segments 16 and one of the second oblique segments 17.

Such circumferential segments 18 lessen the bending stress acting on the cord(s) 10 of the tape 9 as compared with the case where the first oblique segment 16 and the second oblique segment 17 are directly connected. As a result, it is possible to suppress the bent portions of the tape 9 from being separated from the underlying structure at the time of winding the tape.

In the present embodiment, at each end 13s in the width direction of the mesh structure 13, the circumferential segments 18 are extend linearly in the tire circumferential direction. More specifically, the circumferential segments 18 which are parallel with the tire circumferential direction, are arranged in line in the tire circumferential direction forming a linear arrangement 18A like a circumferentially continuous tape. Such linear arrangement 18A can hoop the carcass 6 to effectively suppress deformation of the carcass 6. Since the linear arrangement 18A is formed on both sides of the mesh structure 13, the deformation is further effectively suppressed.

As shown in FIG. 3, the linear arrangement 18A in this example is provided with reentrant portions 22 toward the widthwise center of the mesh structure 13.
Such reentrant portions 22 suppress an excessive increase in the rigidity caused by the overlapping of the circumferential segments 18 adjacent to each other in the tire circumferential direction, and as a result, it is possible to improve the rigidity balance of the mesh structure 13 between both end (13) portions and a portion therebetween.

When the circumferential length Lb of the reentrant portions 22 becomes excessively large, there is a possibility that the above-described hooping force to the carcass 6 becomes small. In addition, since the positions of the axially outermost rhombic spaces 19 shift toward the inside in the width direction of the mesh structure 13, the range where the hooping effect is exerted may be reduced.
Therefore, the circumferential length Lb of the reentrant portion 22 is preferably not less than 5%, more preferably not less than 10% of the lengths La of the outermost spaces 19c adjacent to the reentrant portion 22 in the tire axial direction. And the circumferential length Lb is preferably not more than 25%, more preferably not more than 20% of the lengths La of the rhombic spaces 19c.

The mesh structure 13 may be formed by winding one continuous tape 9 or winding the tape 9 formed by connecting plural separate pieces.

Figure 5:
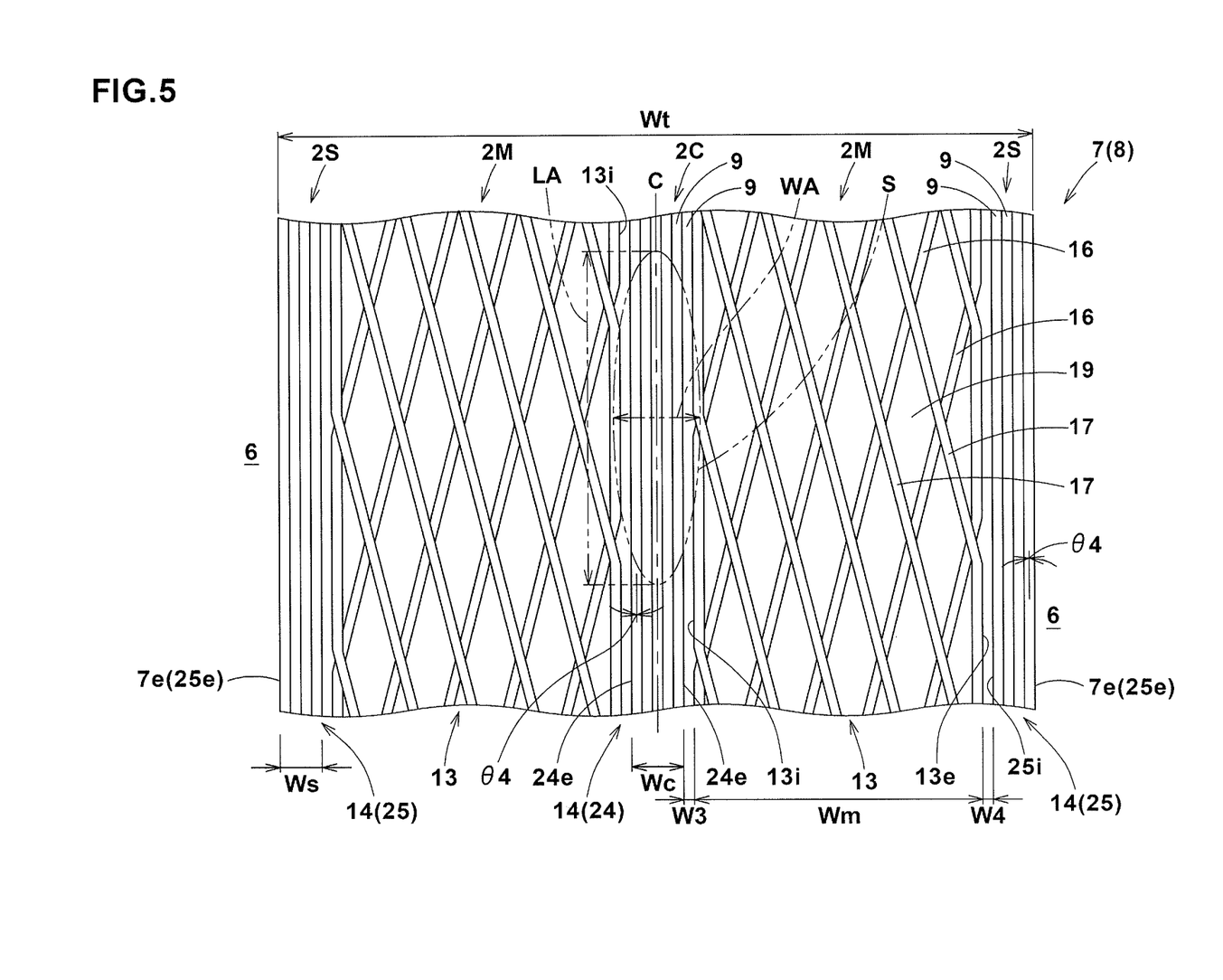
FIG. 5 is a developed partial view of an example of the ply reinforcing structure.

FIG. 5 shows the entire width of the ply reinforcing structure 8 of the present embodiment.

In addition to the mesh structure 13, the ply reinforcing structure 8 includes a spiral structure 14 in which the tape 9 is wound spirally and circumferentially of the tire at least one turn. Such spiral structure 14 exerts a great hooping force on the carcass 6.

In the spiral structure 14, the angle θ4 with respect to the tire circumferential direction of the tape 9 is smaller than the angle θ1 of the first oblique segments 16 and the angle θ2 of the second oblique segments 17, and
the angle θ4 is preferably not more than 5 degrees, more preferably not more than 2 degrees including 0 degree.

In the present embodiment, the mesh structure 13 is mainly formed in each middle region 2M. This greatly improves the cornering performance.
The width Wm of each mesh structure 13 measured therealong is preferably not less than 20%, more preferably not less than 25%, but preferably not more than 48%, more preferably not more than 40% of the developed tread width TW.

The spiral structure 14 includes a center spiral structure 24 formed in the crown region 2c and a lateral spiral structure 25 formed in each shoulder region 2s.

The center spiral structure 24 exerts a large hooping force on the crown region 2C which contacts with the ground during straight running which is mainly a high-speed running, therefore, the high-speed stability performance is improved.

The lateral spiral structure 25 reduces the torsional rigidity of the shoulder region 2S as compared with the case where the mesh structure is formed, therefore, relatively small cornering power is generated. For this reason, the reaction force and vibrations caused by, for example, gaps of the road surface etc. are reduced, so the ground contact feeling is improved. As a result, the lateral spiral structure 25 enables stable cornering with a large leaning angle of the motorcycle, and thereby the cornering performance can be improved.

In this example, the outer edge 25e in the tire axial direction of the lateral spiral structure 25 forms the outer edge 7e of the tread reinforcing layer 7.

The center spiral structure 24 and each lateral spiral structure 25 are each formed by one tape 9. Thereby, the above-described function is effectively exhibited. However, the center spiral structure 24 and each lateral spiral structure 25 may be formed by a plurality of tapes 9.

In the spiral structure 14 in this example, the side edges 9s of the tape 9 contact with each other between the axially adjacent turns of the tape 9.

Further, it is also possible that the side edges 9s are overlapped with each other between the axially adjacent turns of the tape 9.

The spiral structure 14 is separated in the tire axial direction from the mesh structure 13. Thereby, it is possible to suppress an excessive increase in the rigidity caused by the tape 9 of the spiral structure 14 and the adjacent tape 9 in the circumferential segments 18 which basically extend in the tire circumferential direction.

Specifically, in the present embodiment, the center spiral structure 24 and each mesh structure 13 are separated in the tire axial direction. Each second spiral structure 25 and the adjacent mesh structure 13 are separated in the tire axial direction.

During straight running, the crown region 2C is subjected to a higher ground pressure as compared with the shoulder regions 2S. Therefore, the crown region 2C is required to have a higher circumferential rigidity than in the shoulder regions 2S. It is thus, preferred that the shortest distance W3 between the center spiral structure 24 and each mesh structure 13 is set to be smaller than the shortest distance W4 between the mesh structure 13 and the adjacent lateral spiral structure 25, wherein the shortest distance W3 is the distance in the tire axial direction between the outer end 24e in the tire axial direction of the center spiral structure 24 and the inner end 13i in the tire axial direction of the mesh structure 13, and the shortest distance W4 is the distance in the tire axial direction between the inner end 25i in the tire axial direction of the lateral spiral structure 25 and the outer end 13e in the tire axial direction of the mesh structure 13.

If the difference (W4−W3) between the shortest distance W3 and the shortest distance W4 is large, the rigidity in the border area between the shoulder region 2S and the middle region 2M is decreased, and the cornering performance when the motorcycle is leant largely is liable to deteriorate. From such a viewpoint, the difference (W4−W3) is preferably not less than 1 mm, more preferably not more than 4 mm.

The shortest distance W3 between the center spiral structure 24 and the mesh structure 13 may be set to 0 mm. That is, the center spiral structure 24 and the mesh structure 13 may be in contact with each other. In this case, the circumferential rigidity in the border area between the crown region 2C and the middle region 2M is increased, and high-speed stability performance is improved.

The width Wc of the center spiral structure 24 measured therealong is preferably not less than 3%, more preferably not less than 10%, but preferably not more than 30%, more preferably not more than 25% of the developed tread width TW.

The width Ws of each lateral spiral structure 25 measured therealong is preferably not less than 2%, more preferably not less than 7%, but preferably not more than 20%, more preferably not more than 15% of the developed tread width TW.

In the present embodiment, the mesh structure 13 is disposed in each middle region 2M. However, it may be also possible to dispose the mesh structure 13 in each of the crown region 2C and the shoulder regions 2S. Further, it may be possible to dispose the mesh structure 13 over two or more of the crown region 2C, middle region 2M and shoulder region 2S.

While detailed description has been made of an especially preferable embodiment of the present invention, the present invention can be embodied in various forms without being limited to the illustrated embodiment.

Comparison Tests

Motorcycle tires having the internal structure shown in FIG. 1 and tread reinforcing layers based on that shown in FIG. 5 were experimentally manufactured as test tires (practical examples Ex1-Ex8 and comparative example REF1). The tread reinforcing layers had specifications shown in Table 1. Common specifications are as follows.

Tape: width 4.0 mm, thickness 1.0 mm, three cords embedded
  width Wt of Tread reinforcing layer: 90% of TW
  width Wm of Mesh structure: 40% of TW
  width Wc of Center spiral structure: 6.0% of TW
  width Ws of Lateral spiral structure: 2.0% of TW The tires were tested for the high speed stability performance and cornering performance as follows.

<High-Speed Stability Performance Test>

The test tires were mounted on a 1000 cc motorcycle, and the motorcycle was run on a dry asphalt road of a test course.
  Front Wheel:
  Tire size 120/70ZR17, Rim size 17M/CxMT3.50,
  Tire pressure 250 kPa
  Rear Wheel:
  Tire size 180/55ZR17, Rim size 17M/CxMT5.50,
  Tire pressure 250 kPa During running, the test rider evaluated high-speed stability performance based on high-speed running characteristics such as handle stability, grip and the like.

The results are indicated in Table 1 by an index based on Comparative example REF1 being 100, wherein the larger the numerical value, the better the performance.

<Cornering Performance Test> using an indoor tire testing machine, the test tires were measured for the cornering force under the following conditions and then cornering power was calculated.
  Tire size: 120/70ZR17
  Tire pressure: 250 kPa
  Tire load: 1.3 kN The cornering power is obtained from the equation {CF(+1 degree)−CF(−1 degree)}/2, namely, by subtracting a cornering force value CF(−1 degree) at the slip angle of −1 degree from a cornering force value CF(+1 degree) at the slip angle of +1 degree in order to obtain their difference, and then dividing the difference by 2. Thus, the cornering power is the cornering force per 1 degree of the slip angle.
The results are indicated in Table 1 by an index based on Comparative example REF1 being 100, wherein the larger the numerical value, the higher the cornering power.

TABLE 1

| Tire | REF1 | Ex1 | Ex2 | Ex3 | Ex4 | Ex5 | Ex6 | Ex7 | Ex8 |
|---|---|---|---|---|---|---|---|---|---|
| La/LA (%) | 2/3 | 3/5 | 2/5 | 1/3 | 3/5 | 3/5 | 3/5 | 3/5 | 3/5 |
| Wa/WA (%) | 2/3 | 3/5 | 2/5 | 1/3 | 2/3 | 3/5 | 3/5 | 3/5 | 3/5 |
| Lb/LA (%) | 15 | 15 | 15 | 15 | 15 | 5 | 4 | 25 | 27 |
| High-speed stability | 100 | 100 | 100 | 100 | 100 | 105 | 104 | 98 | 97 |
| Cornering performance | 100 | 115 | 115 | 110 | 110 | 111 | 113 | 117 | 117 |

From the test results, it was confirmed that the tires according to the present invention were improved in the cornering performance as compared with the comparative example.

DESCRIPTION OF THE REFERENCE SIGNS 1 tire
2 tread portion
7 tread reinforcing layer
8 ply reinforcing structure
9 tape
13 mesh structure
16 first oblique segments
17 second oblique segments
19 rhombic space
S ground contacting patch

The invention claimed is:

1. A tire comprising a toroidal carcass and a tread reinforcing layer disposed radially outside the carcass in a tread portion of the tire, wherein
the tread reinforcing layer comprises a ply reinforcing structure in which a tape of at least one reinforcing cord coated with topping rubber is wound,
the ply reinforcing structure comprises
a plurality of first oblique segments in which the tape is inclined with respect to the tire circumferential direction to one side in the tire axial direction, and
a plurality of second oblique segments in which the tape is inclined with respect to the tire circumferential direction to the other side in the tire axial direction
so that the second oblique segments intersect the first oblique segments, and
the first oblique segments are arranged so that the side edges thereof do not contact with each other, and the second oblique segments are arranged so that the side edges thereof do not contact with each other, whereby the intersecting first and second oblique segments form a mesh structure having rhombic spaces,
wherein
circumferential lengths of the rhombic spaces are less than 2/3 times a maximum circumferential length of a ground contacting patch of the tread surface of the tread portion occurred when the tire in a normally loaded state is contacted with a flat horizontal surface at a camber angle of 0 degree,
the mesh structure is disposed in a middle region between the tire equator and a tread edge on each side of the tire equator, such that the mesh structure is disposed on each side of the tire equator, and
the ply reinforcing structure comprises, in a crown region including the tire equator, a center spiral structure in which the tape extends circumferentially of the tire and spirally one or more turns, and further
the ply reinforcing structure comprises, in a shoulder region including the tread edge, a lateral spiral structure in which the tape extends circumferentially of the tire and spirally one or more turns.

2. The tire according to claim 1, wherein
the circumferential lengths of the rhombic spaces are not less than 2/5 times the maximum circumferential length of the ground contacting patch of the tread surface.

3. The tire according to claim 2, wherein
axial lengths of the rhombic spaces are less than 2/3 times the maximum circumferential length of the ground contacting patch of the tread surface.

4. The tire according to claim 3, wherein
the axial lengths of the rhombic spaces are not less than 2/5 times the maximum circumferential length of the ground contacting patch of the tread surface.

5. The tire according to claim 1, wherein
axial lengths of the rhombic spaces are less than 2/3 times the maximum circumferential length of the ground contacting patch of the tread surface.

6. The tire according to claim 5, wherein
the axial lengths of the rhombic spaces are not less than 2/5 times the maximum circumferential length of the ground contacting patch of the tread surface.

7. The tire according to claim 1, wherein
the mesh structure comprises a plurality of circumferential segments in which the tape extends substantially parallel with the tire circumferential direction, and
both ends in the tire circumferential direction of each of the circumferential segments are respectively connected to one of the first oblique segments and one of the second oblique segments.

8. The tire according to claim 7, wherein
the circumferential segments are disposed at each end in the width direction of the mesh structure, and, at the each end, the circumferential segments are arranged substantially in line in the tire circumferential direction forming a linear arrangement.

9. The tire according to claim 8, wherein
the linear arrangement of the circumferential segments is provided with reentrant portions toward the widthwise center of the mesh structure.

10. The tire according to claim 9, wherein
circumferential lengths of the reentrant portions are not less than 10% and not more than 25% of the circumferential length of the outermost rhombic spaces adjacent to the reentrant portions in the tire axial direction.

11. A tire comprising a toroidal carcass and a tread reinforcing layer disposed radially outside the carcass in a tread portion of the tire, wherein the tread reinforcing layer comprises a ply reinforcing structure in which a tape of at least one reinforcing cord coated with topping rubber is wound, the ply reinforcing structure comprises a plurality of first oblique segments in which the tape is inclined with respect to the tire circumferential direction to one side in the tire axial direction, and a plurality of second oblique segments in which the tape is inclined with respect to the tire circumferential direction to the other side in the tire axial direction so that the second oblique segments intersect the first oblique segments, and the first oblique segments are arranged so that the side edges thereof do not contact with each other, and the second oblique segments are arranged so that the side edges thereof do not contact with each other, whereby the intersecting first and second oblique segments form a mesh structure having rhombic spaces, wherein circumferential lengths of the rhombic spaces are less than ⅔ times a maximum circumferential length of a ground contacting patch of the tread surface of the tread portion occurred when the tire in a normally loaded state is contacted with a flat horizontal surface at a camber angle of 0 degree, the mesh structure is disposed in a middle region between the tire equator and a tread edge on each side of the tire equator, such that the mesh structure is disposed on each side of the tire equator, and the ply reinforcing structure comprises, in a crown region including the tire equator, a center spiral structure in which the tape extends circumferentially of the tire and spirally one or more turns, and further the ply reinforcing structure comprises, between the mesh structures on both sides of the tire equator, the center spiral structure in which the tape extends circumferentially of the tire and spirally one or more turns, wherein the tire includes tread edges on opposite sides of the tire equator, and the ply reinforcing structure comprises, in each of two shoulder regions including the respective tread edges, a lateral spiral structure in which the tape extends circumferentially of the tire and spirally one or more turns.

\* \* \* \* \*